United States Patent
Gertz

(10) Patent No.: US 7,243,964 B1
(45) Date of Patent: *Jul. 17, 2007

(54) TRUCK MOUNTED CRASH ATTENUATOR

(75) Inventor: David C. Gertz, San Clemente, CA (US)

(73) Assignee: Traffix Devices, Inc, San Clemente, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/364,662

(22) Filed: Feb. 27, 2006

Related U.S. Application Data

(63) Continuation of application No. 11/136,353, filed on May 23, 2005, now abandoned, which is a continuation of application No. 10/413,074, filed on Apr. 14, 2003, now Pat. No. 6,926,324, which is a continuation of application No. 09/561,480, filed on Apr. 28, 2000, now Pat. No. 6,581,992.

(60) Provisional application No. 60/131,626, filed on Apr. 28, 1999.

(51) Int. Cl.
    *B60R 19/18* (2006.01)
(52) U.S. Cl. .......... 293/133; 404/6; 256/13.1; 188/377
(58) Field of Classification Search .......... 293/133; 404/6; 256/13.1; 188/377
    See application file for complete search history.

(56) References Cited

U.S. PATENT DOCUMENTS

| | | | |
|---|---|---|---|
| 4,352,484 A | 10/1982 | Gertz et al. | |
| 4,658,941 A | 4/1987 | Gottwald et al. | |
| 4,711,481 A | 12/1987 | Krage et al. | |
| 5,052,732 A * | 10/1991 | Oplet et al. | 293/102 |
| 5,199,755 A | 4/1993 | Gertz | |
| 5,248,129 A | 9/1993 | Gertz | |
| 5,403,112 A | 4/1995 | Carney, III | |
| 5,403,113 A | 4/1995 | Gertz et al. | |
| 5,642,792 A | 7/1997 | June | |
| 5,823,584 A | 10/1998 | Carney, III | |
| 6,092,959 A | 7/2000 | Leonhardt et al. | |
| 6,581,992 B1 | 6/2003 | Gertz et al. | |
| 6,905,282 B2 * | 6/2005 | Leonhardt et al. | 404/6 |
| 6,926,324 B1 | 8/2005 | Gertz | |

FOREIGN PATENT DOCUMENTS

WO   WO 94/05527   9/1993

* cited by examiner

*Primary Examiner*—Dennis H. Pedder
(74) *Attorney, Agent, or Firm*—Stout, Uxa, Buyan & Mullins, LLP; Donald E. Stout

(57) ABSTRACT

A truck mounted attenuator (TMA) is constructed to minimize length during use in a horizontal position and height in a vertical transport position, as well as to minimize wind resistance and buffeting at highway speeds. A modular construction is employed, so that only damaged portions of the TMA can be removed and replaced in the field after a vehicle impact. The TMA comprises a plurality of outwardly curved tubular structural members which are designed to buckle upon application to the TMA of forces resulting from vehicular impact. The rigid tubes buckle at a high initial force, then proceed to crush at a lower force once the sides have buckled outwardly sufficiently to protect vehicle occupants during the critical first two feet of travel after impact. This design also provides increased protection for errant vehicles which impact the TMA device from an angle (i.e. "coffin corner" impact).

11 Claims, 12 Drawing Sheets

TRUCK MOUNTED CRASH ATTENUATOR

This application is a continuation under 35 U.S.C. 120 of U.S. patent application Ser. No. 11/136,353, filed on May 23, 2005, now abandoned, which in turn is a continuation of U.S. patent application Ser. No. 10/413,074, filed on Apr. 14, 2003 and now U.S. Pat. No. 6,926,324, which in turn is a continuation of U.S. patent application Ser. No. 09/561,480, filed on Apr. 28, 2000, and now U.S. Pat. No. 6,581,992, which in turn claimed the benefit under 35 U.S.C. 119(e) of U.S. Provisional Application Ser. No. 60/131,626, filed on Apr. 28, 1999. All of the above reference applications are herein expressly incorporated by reference.

BACKGROUND OF THE INVENTION

1. Field of the Invention

This invention relates to attenuators which are particularly adapted for the absorption of energy in the event of an impact between an errant vehicle and a second, typically stationary or slow-moving vehicle, in the hope of minimizing injury to the occupants of both vehicles, and, more specifically, to truck-mounted crash attenuators.

2. Description of the Related Art

Truck mounted attenuators (TMA's) have been in use for many years. TMA's typically comprise a fixed backup mounted to a dump truck or other vehicle and an energy absorbing cartridge attached to the fixed backup. In some TMA's, the cartridge is attached to the fixed backup via a hinge to allow for rotation of the cartridge to a vertical orientation for transport. The TMA cartridge absorbs the impact of an errant vehicle that collides with it, thereby protecting the truck, the vehicle, and the occupants of both.

One important purpose for the TMA's deployed on trucks and other vehicles, typically those used in highway construction, is for protecting workers in those vehicles. The trucks equipped with TMA's are referred to as shadow vehicles, barrier vehicles, and advance warning vehicles. Shadow vehicles are moving trucks that effectively block errant vehicles in the flow of traffic from striking the workers directly ahead of the truck. The protected workers typically perform mobile activities, such as crack pouring, patching utility work, striping, coning, pavement repair, pavement marking, and delineator repair, and the shadow vehicle moves with and behind the workers. Barrier vehicles are effectively used to protect vehicles in the flow of traffic from a hazardous situation, such as blocking open excavations. The barrier vehicles may be unoccupied. Advance warning vehicles may be used to warn the drivers in the flow of traffic of an upcoming moving or stationary situation. An example of an advance warning vehicle is a truck in a lane of a highway displaying an arrow indicating that the lane is closed ahead and that vehicles in the lane need to start to merge into another lane.

A TMA functions by attempting to decelerate a vehicle that collides with it as safely as possible. Some TMA's have been demonstrated to safely decelerate vehicles traveling up to 100 km/hr. To accomplish the deceleration, a typical prior art TMA is relatively long (approximately 12 to 15 feet). Such a length makes it no longer practical to rotate an entire cartridge that is directly attached to the fixed backup due to excessive height.

Some TMA's have a fixed section or a strut attached to the fixed backup and the cartridge is rotatably mounted to the strut. The strut/cartridge configuration reduces the height of the vertically positioned cartridge, but the configuration extends quite far back from the rear of the truck. Because prior art TMA's employ The wind resistance of the cartridge tends to create buffeting problems, which can make driving hazardous.

SUMMARY OF THE INVENTION

The present invention overcomes the problems of the prior art, namely excessive length during use in a horizontal position, and excessive height in a vertical transport position, as well as wind resistance and buffeting at highway speeds, and limited protection for errant vehicles which impact the TMA device from an angle (i.e. "coffin corner" impact).

Other advantages of the inventive system include its simple, low cost construction, as well as its modular construction, so that only damaged portions of the TMA can be removed and replaced in the field after impact.

The inventive system utilizes a novel method of buckling outwardly curved tubular members which comprise each member of the TMA system; i.e. the strut member and the cartridge member. The rigid sides of the cartridge are buckled at a high initial force, then proceed to crush at a lower force once the sides have buckled outwardly sufficiently to protect vehicle occupants during the critical first two feet of travel after impact. The goal is to prevent the vehicle from decelerating at a rate of more than 40 ft/sec. during this critical two feet of travel.

The invention, together with additional features and advantages thereof, may best be understood by reference to the following description taken in conjunction with the accompanying illustrative drawing.

DESCRIPTION OF THE PREFERRED EMBODIMENTS

Figure 1:
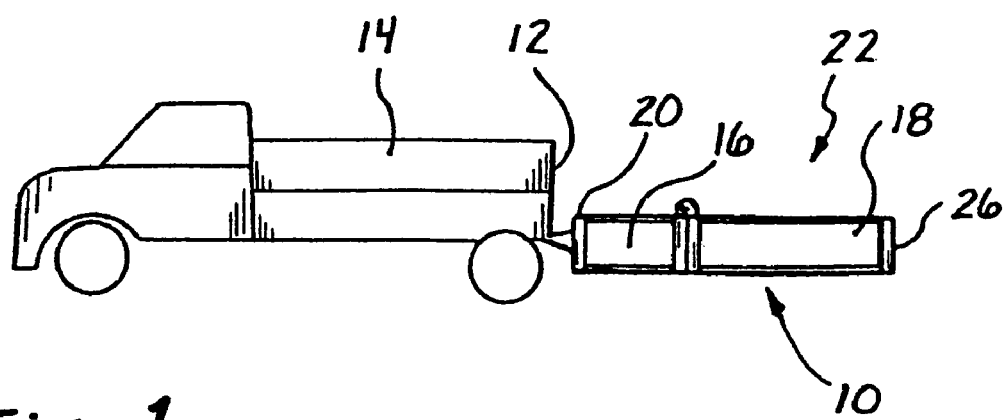
FIG. 1 is a side view of a truck which is equipped with a truck mounted attenuator which is deployed in a horizontal or use orientation according to an embodiment of the invention.
Figure 2:
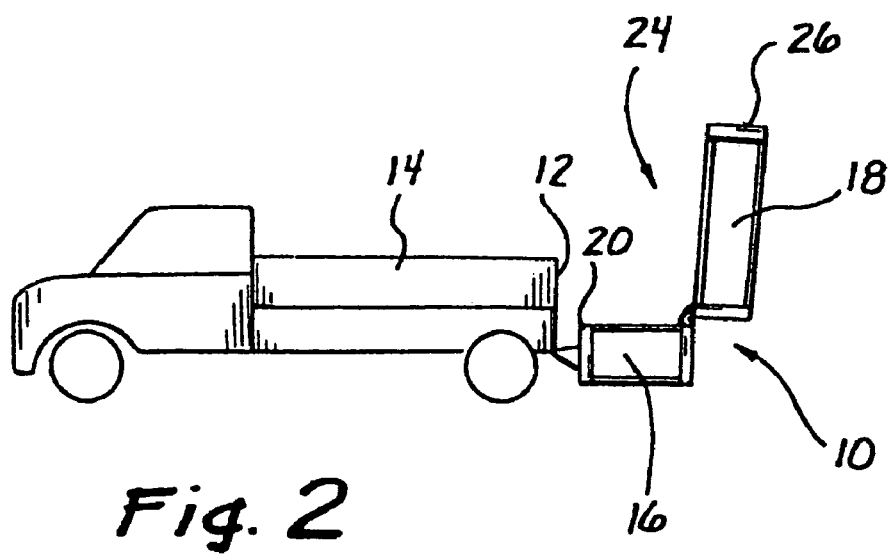
FIG. 2 is a side view of the truck of FIG. 1 with the truck mounted attenuator in a vertical or transport orientation.

Referring now to the figures, wherein like reference numerals refer to like elements throughout the figures, and referring specifically to FIGS. 1 and 2, a truck mounted crash attenuator (TMA) 10 is mounted to a rear end 12 of a truck 14. The TMA 10 is comprised of a strut 16 and a cartridge 18. The TMA strut 16 is attached to a backup 20 that is rigidly attached to the truck rear end 12. The TMA cartridge 18 is pivotally attached to the strut 16 and is located behind the truck 14.

As discussed below, embodiments of the invention have a reduced length compared to the prior art due to the design of the strut 16 and the cartridge 18. The energy absorbing cartridge 18 is designed to first decelerate lightweight colliding vehicles with a maximum velocity change of 40 ft/sec during the first two feet of occupant travel after impact. The distance the cartridge crushes is less if the compression force is initially high and then lower (see FIG. 9). Embodiments of the present invention are designed to function in this manner so that the required length of the cartridge is reduced compared to the prior art.

The TMA 10 is shown in a use position or orientation 22 in FIG. 1 and a transport position or orientation 24 in FIG. 2. In the use orientation 22, the cartridge 18 is in a down or horizontal position such that the TMA extends linearly away from the truck rear end 12. An end surface 26 of the cartridge 18 is in a rearwardmost position relative to the truck 12. When in the use orientation 22, the truck 14 is oriented such that the cartridge end surface 26 is facing oncoming traffic. An errant vehicle (not shown) would collide with the cartridge end surface 26 and the TMA would function to absorb the crash impact. In the transport orientation 24, the cartridge 18 is in an up or vertical position such that the cartridge is at a right angle to the strut 16. When the cartridge 18 is in the transport orientation 24, the truck 14 is typically en route to a job site.

Figure 3:
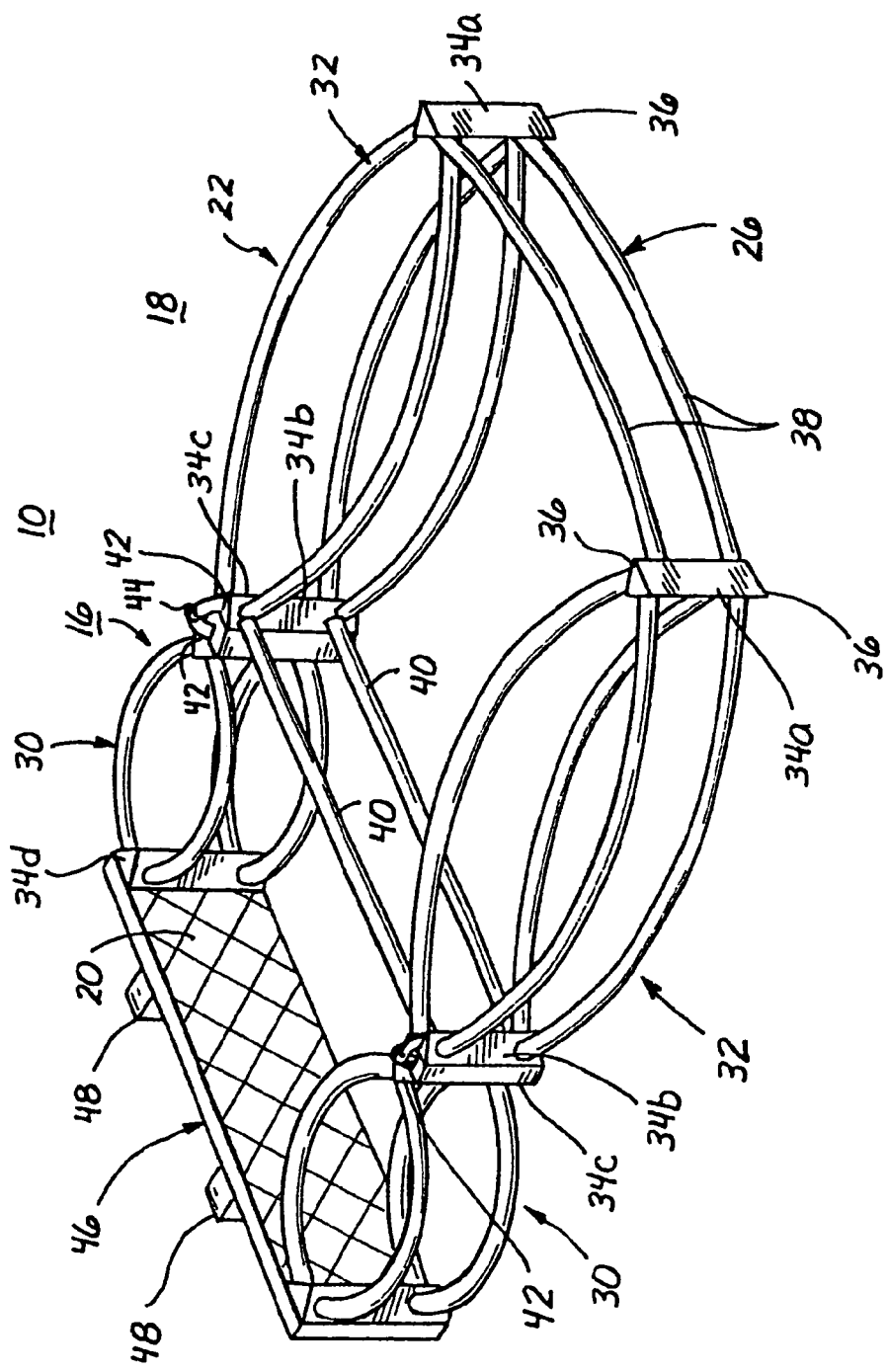
FIG. 3 is an isometric view of the truck mounted attenuator of FIG. 1.

Referring now to FIG. 3, the TMA 10 in a first embodiment is comprised of strut side hoops 30 and cartridge side hoops 32. In the shown embodiment, the hoops 30 and 32 are horizontally oriented and there are two vertically aligned and spaced apart hoops to each side, such that there is a vertical column of hoops on each side of the cartridge 18 and each side of the strut 16. Each of the hoops 30 and 32 are shown extending between opposing ends 36 of two separator members 34. Separator members 34a define the sides of the cartridge end surface 26. Extending between the ends 36 of the two separator members 34a are two vertically aligned, laterally oriented bowed members 38. The bowed members 38 preferably bow horizontally outwards. Other embodiments of the invention may have more than two vertically aligned hoops per column, may have more than two columns of hoops per cartridge or strut, or may have more than one column of hoops per side of the cartridge or strut.

The cartridge side hoops 32 extend from the separator members 34a and terminate at separator members 34b. Extending between the ends 36 of the separator members 34b are two vertically aligned, laterally oriented members 40. The cartridge side hoops 32, the separator members 34a and 34b, the bowed members 38, and the members 40 define the cartridge 18.

Figure 4:
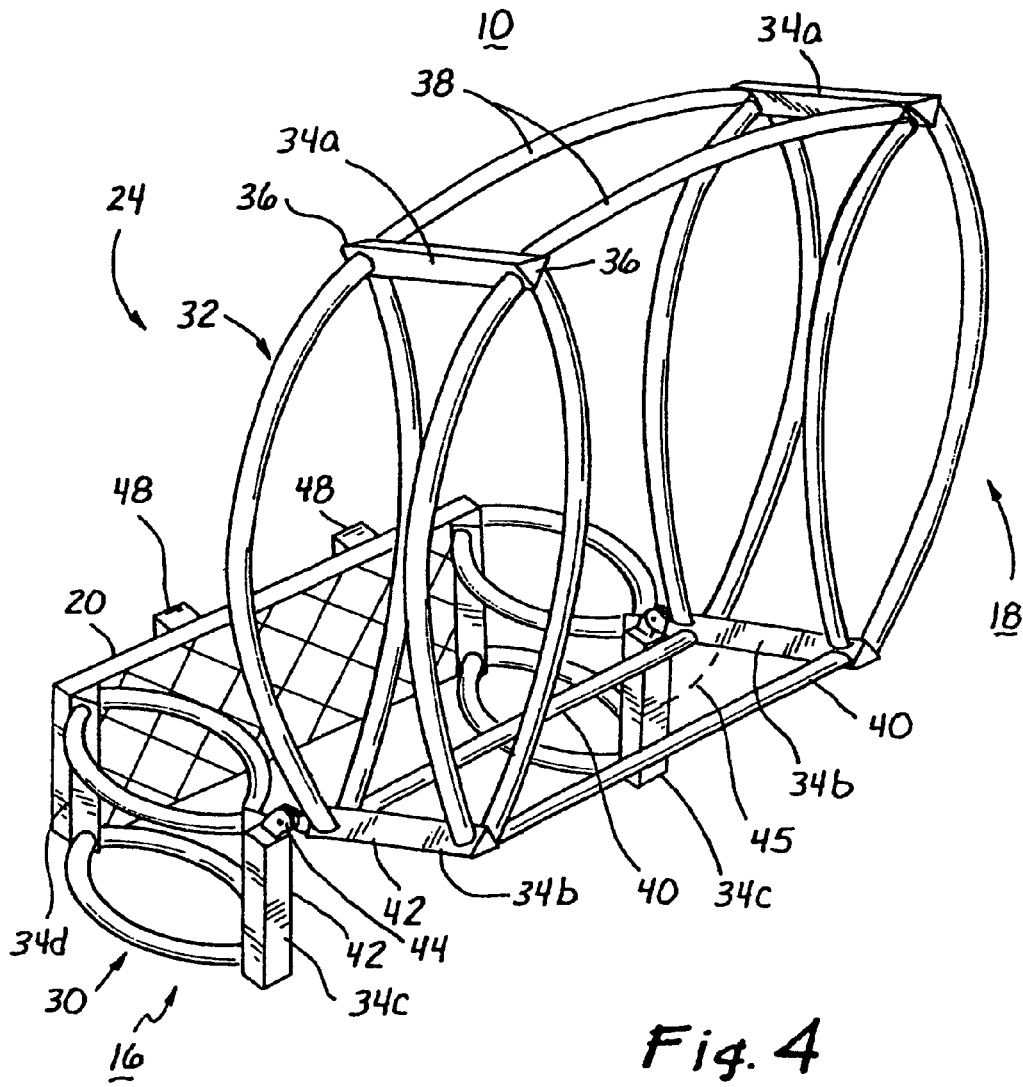
FIG. 4 is an isometric view of the truck mounted attenuator of FIG. 2.

The separator members 34b of the cartridge 18 are aligned with and adjacent to a pair of separators 34c, which form a part of the strut 16. The top ends 42 of the adjacent separator members 34b and 34c are connected via a pivot connection 44 that enables the cartridge 18 to be raised to the up or vertical position, as shown in FIG. 4.

The strut side hoops 30 extend from the separator members 34c and terminate at separator members 34d that are attached in a vertical orientation to the backup 20. In the illustrated embodiment of the invention, the backup 20 is a vertically oriented rectangular support for the TMA 10. Other embodiments of the invention may have other suitable backups. The backup 20, the strut side hoops 30, and the separator members 34c and 34d define the strut 16. Extending from a surface 46 of the backup 20 that opposes the strut 16 are two brackets 48 for attaching the TMA 10 to the truck rear end 12.

FIG. 3 shows the TMA 10 in the use orientation 22. Referring now to FIG. 4, the TMA is shown in the transport orientation 24, with an approximately 90 degree angle 45 between the separator members 34b of the cartridge 18 and the separator members 34c of the strut 16.

Figure 5:
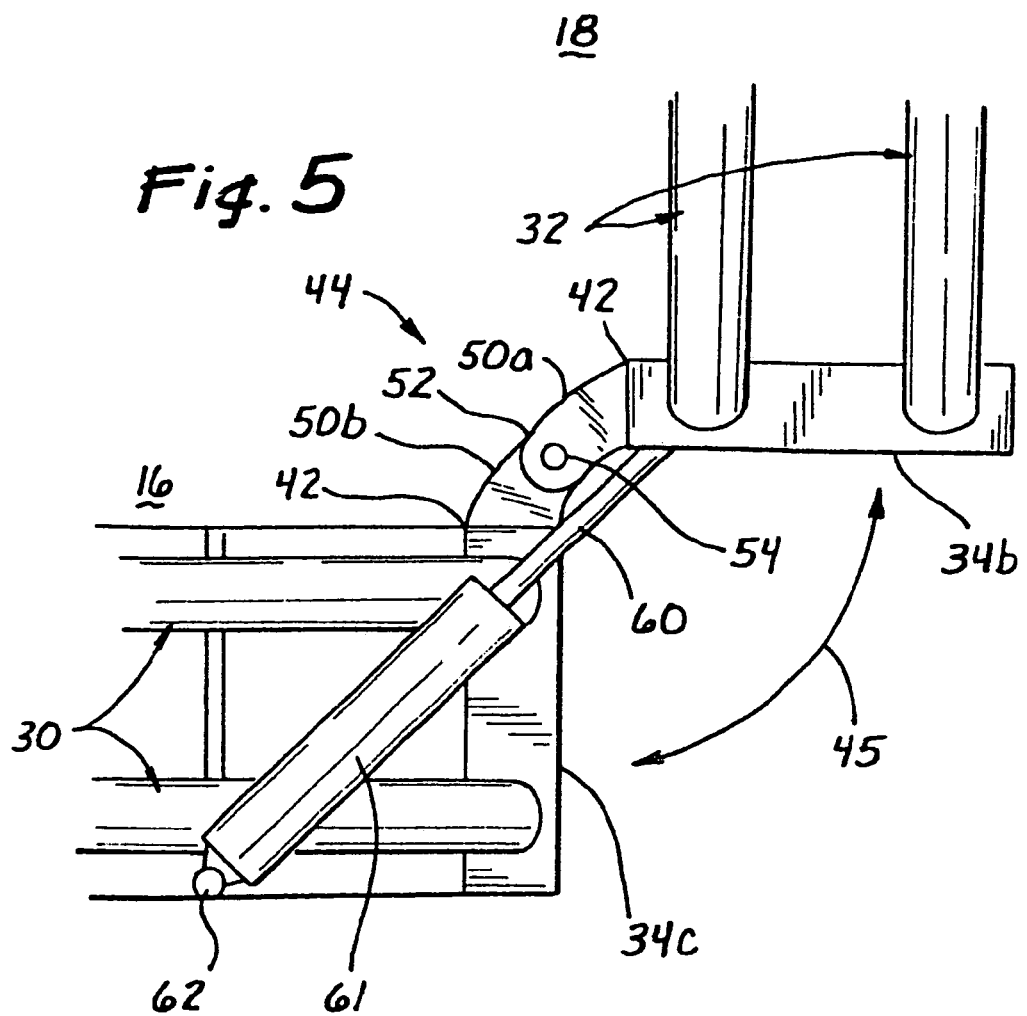
FIG. 5 is a detail view of the pivot connection between the strut and cartridge of the truck mounted attenuator of FIG. 2.

Referring now to FIG. 5, a detail of the pivot 44 between the strut 16 and the cartridge 18 of a preferred embodiment of the invention is shown. The pivot 44 is comprised of pivot members 50a and 50b that extend from the ends 42 of the separator members 34b and 34c. The pivot member 50a that extends from separator member 34b extends toward the strut 16. Likewise, the pivot member 50b that extends from the separator member 34c extends toward the cartridge 18. The pivot members 50 have overlapping portions 52 through which extends a pivot pin 54. Other embodiments of the invention may have other suitable pivots.

Figure 7:
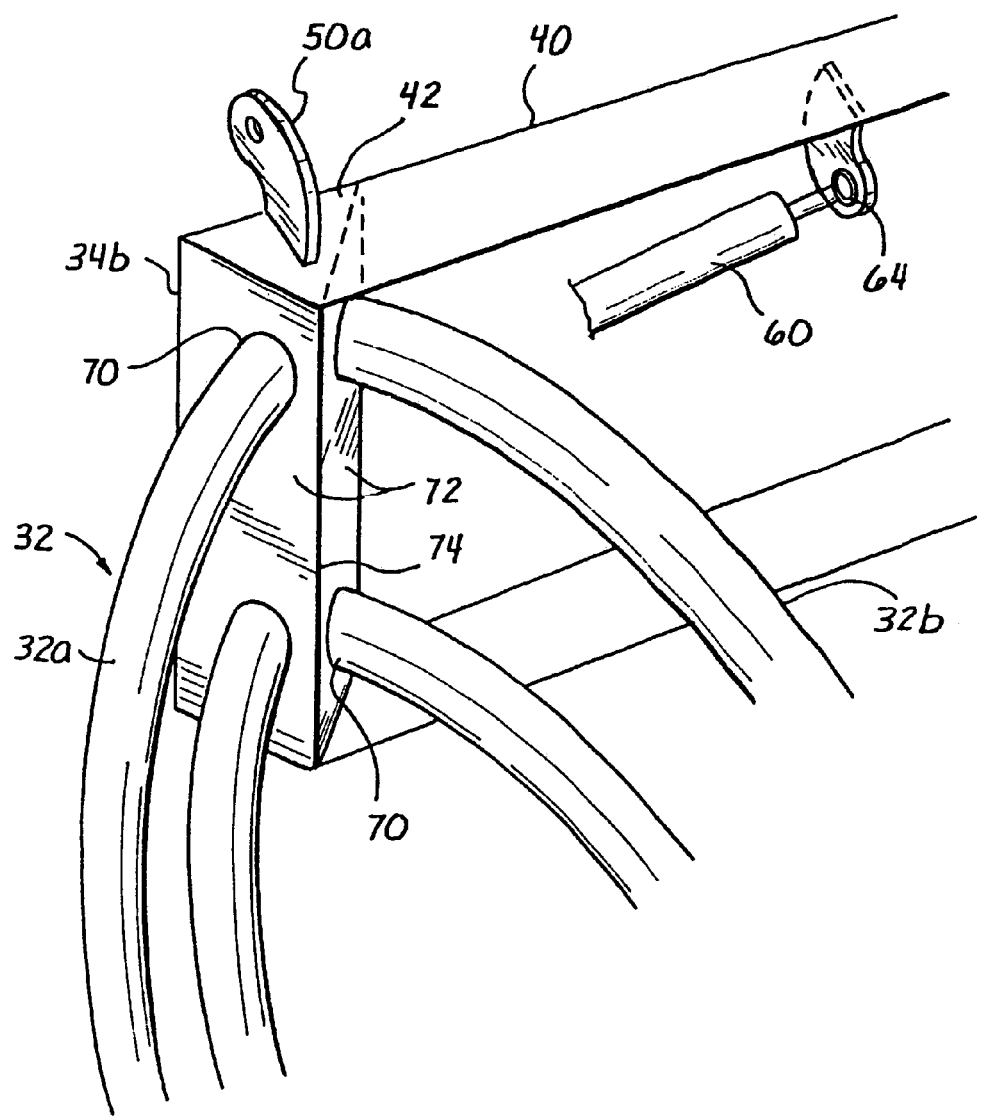
FIG. 7 is a detail view of the construction of the truck mounted attenuator of FIG. 1.

FIG. 5 also shows a hydraulic piston 60 that may be used to raise and lower the cartridge 18, between the use orientation and the transport orientation described supra. The cartridge 18 weighs approximately 250 to 300 pounds in this embodiment, making the cartridge unwieldy to move. The hydraulic piston 60 has a first end 62 that is pivotally attached to the lower one of the strut side hoops 30. A second end 64 of the hydraulic piston 60 is pivotally attached to the cross member 40 (this attachment end is shown in FIG. 7). By extending the hydraulic piston 60 telescopically out of the hydraulic cylinder 61, the cartridge 18 is pivoted upwards. Further, the hydraulic piston assembly functions to assist in holding the cartridge 18 in place relative to the strut 16. Other embodiments of the invention may have other devices for raising, lowering, and securing the cartridge 18 in a desired position.

Figure 6:
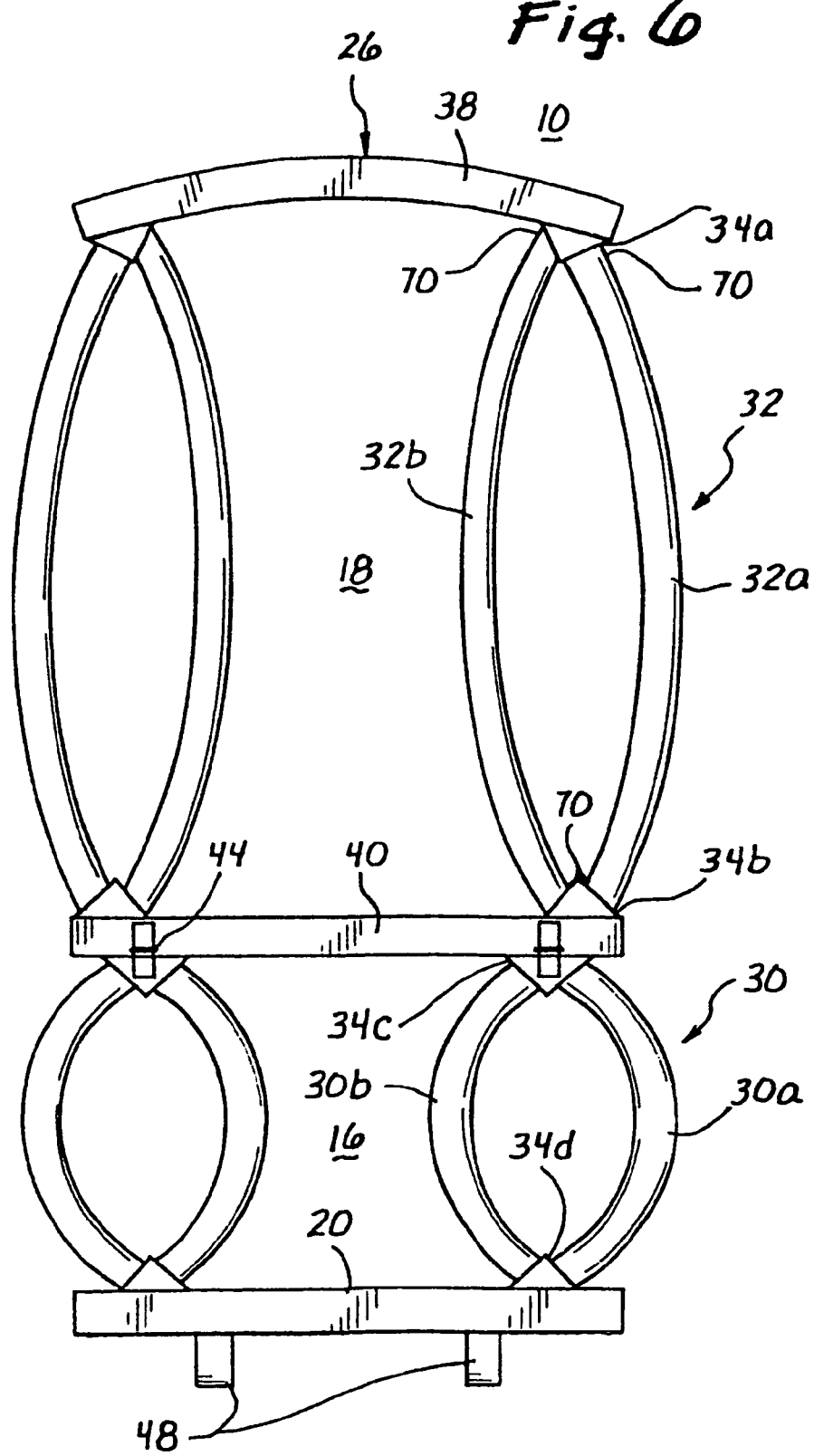
FIG. 6 is a top view of the truck mounted attenuator of FIG. 1.

Now referring to FIG. 6, the bowed configurations of the bowed members 38 and of the hoops 30 and 32 are more particularly shown. The bowed members 38 (one shown) are part of the cartridge end surface 26 and preferably bend outwards in convex fashion. In this embodiment of the invention, the cartridge side hoops 32 are comprised of an outer bowed member 32a and an inner bowed member 32b. The outer bowed member 32a bends outwardly in convex fashion while the inner bowed member bends inwardly in concave fashion. Ends 70 of the bowed members 32a and 32b are attached to the respective separator members 34a and 34b. Thus, the members 32a and 32b form the cartridge side hoops 32. Outer bowed members 30a, inner bowed members 30b and separator members 34c and 34d similarly form the strut side hoops 30.

Other embodiments of the invention may have arrangements such that all bowed members may bend outwardly. These embodiments may have two or more nested columns of hoops. In another embodiment of the invention, which will be described infra, one or more outer bowed members may not be paired with an inner bowed member. In another embodiment of the invention, one or more inner bowed members may not be paired with an outer bowed member.

Referring now more particularly to FIG. 7, in this embodiment of the invention, the separator member 34b is comprised of two vertically oriented sides 72 that meet at an apex 74 which extends into the hoop 32. The ends 70 of the members 32a and 32b are attached to the sides 72. More specifically, the ends 70 mate with holes (not shown) in the sides 72 and are welded in place. FIG. 7 additionally shows the hydraulic piston second end 64 attached to the member 40 but spaced apart from the separator member 34b. Other embodiments of the invention may have other constructions of the separator members and/or may have the bowed member ends attached differently to the separator members.

Figure 8:
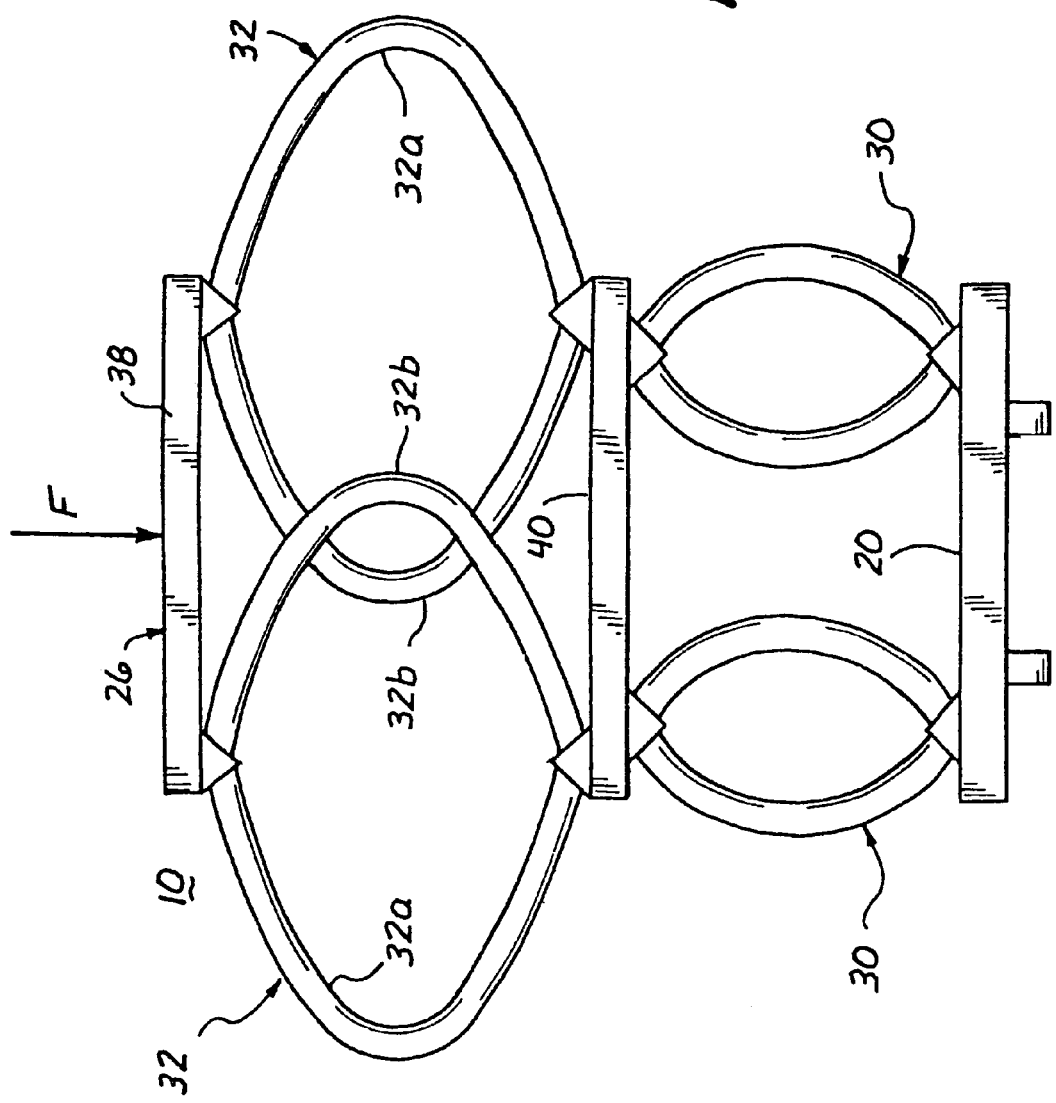
FIG. 8 is a top view of the truck mounted attenuator of FIG. 6 after a force F has been applied to it and the hoops have been compressed.

Referring now to FIG. 8, a purpose of the TMA 10 is to absorb the force F of an impact from a vehicle. In this illustration, the force F has been applied to the cartridge end surface 26, resulting in the straightening of the bowed members 38 of the end surface and the compression of the cartridge hoops 32. The force F is absorbed through the noted deformation of the bowed members 32a and 32b of the hoops 32. The force to initiate the buckling of the bowed members 32a and 32b is relatively high. Once the hoop bowed members 32a and 32b have buckled sufficiently to crease, a lower force is required to further compress the hoops 32 (See FIG. 9). At this stage of the deformation, the strut hoops 30 are not deformed. If the force F is great enough, the strut hoops 30 will also be compressed while absorbing the impact. Note that the inner extending members 32b of the cartridge hoop 32 have been vertically separated sufficiently that they overlap, rather than contact one another during compression.

The bowed members of the hoops 30 and 32 are preferably fabricated of tubes made of aluminum, as are the bowed members 38 of the cartridge end surface 26. The deformation properties of the bowed tubes provides for a favorably high load absorption prior to creasing compared to other geometries. Aluminum is the preferred material of construction for many, if not all, of the structural components of the TMA 10 due to the relatively low density of aluminum compared to other metals. Other embodiments of the invention may use tubes of other metals or suitable materials, such as composite materials. Other embodiments of the invention may use closed structural members other than tubes. Other embodiments of the invention may use open structural members, such as W or C channel.

Figure 9:
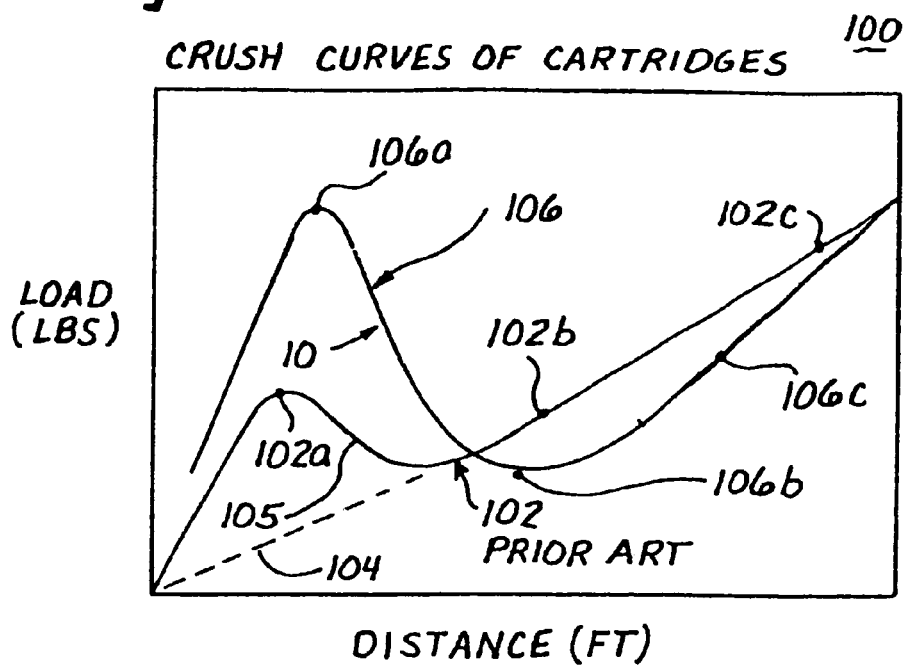
FIG. 9 is a plot of the crash curves of the cartridges in the prior art and according to an embodiment of the invention.
Figure 12:
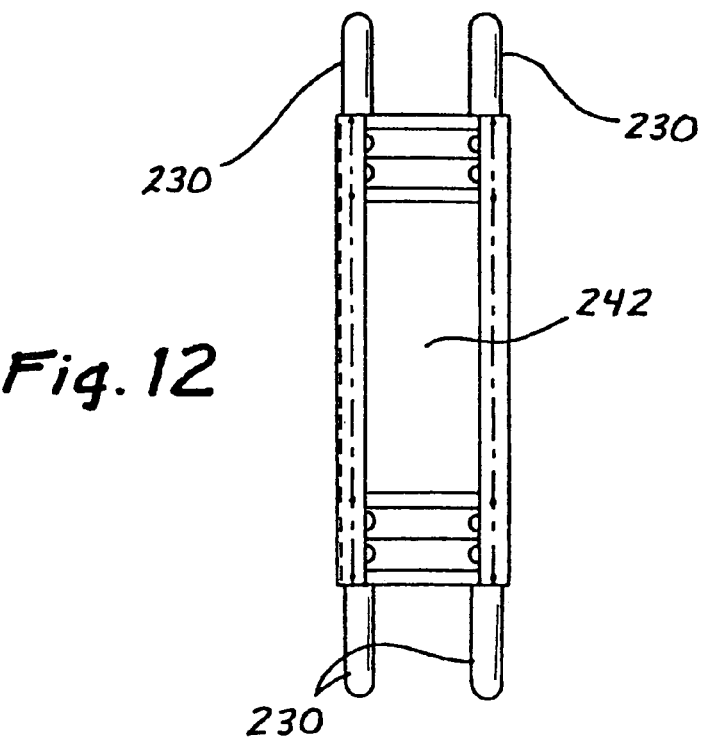
FIG. 12 is a rear view of the truck mounted attenuator illustrated in FIG. 10.

Referring now to FIG. 9, a graph 100 entitled Crush Curves of Cartridges shows plots of relative loads per distance during impact absorption for a typical prior art cartridge 102 and a cartridge according to an embodiment of the invention 10. The prior art plot 102 has a peak force 102a, a force 102b at the end of a two foot flail space, and a force 102c at a final stopping distance. The two foot flail space represents the distance that the driver's head travels before striking the windshield.

The prior art plot 102 is basically a direct linear relationship between the load and the distance, as shown by dashed line 104. The linear relationship is compromised near the beginning of the distance, identified as a mass effect 105 which has the peak force 102a at its apex. The mass effect 105 results from the impacting vehicle initially losing velocity when the mass of the rear of the cartridge is accelerated to approximate the velocity of the impacting vehicle.

The peak force 102a is roughly the same load as the two foot flail space force 102b. Further, the load 102c at the end of the stopping distance is greater than the other two loads 102a and 102b. The disadvantage of the greater stopping force load 102c is that it typically peaks at 20 g, or 20 times the gravitational force, which is the tolerable limit.

The plot 106 of a preferred embodiment of the invention has a peak force 106a, a two foot flail force 106b, and a stopping distance 106c. The peak force 106a for the embodiment of the invention is greater than the prior art peak force 102a. This beneficially results in much more of the impact force being absorbed by the embodiment of the invention in the early stages of the collision. Additionally, the two foot flail force 106b is much lower than the peak force 106a, resulting in a greater percentage of the force being absorbed in the early stages of the collision. With a greater force being absorbed earlier, the distance required to stop the vehicle after impact, which is the distance the TMA is compressed, is shortened, such that the distance at the stopping force 102c is typically 16 feet, whereas the distance at the stopping force 106c of an embodiment of the invention is only approximately 13 feet. The shorter stopping distance of the embodiment of the invention permits the use of a shorter TMA, with its attendant benefits.

Another important advantage of the present invention is that the TMA 10 has an open construction. In other words, while a plurality of interengaged tubular members form the TMA 10, there are large open regions between the various tubular members, unlike typical prior art TMA's, such as the TMA disclosed in U.S. Pat. No. 5,642,792 to June, which is largely comprised of a frame enclosing a solid energy absorbing element. The significance of the inventive open construction is a resultant substantially decreased wind resistance when the TMA is in its transport orientation, with the cartridge in its upright position, as shown in FIG. 2. In this orientation, enclosed TMA's detrimentally function as a sail, resulting in complications in transport, including potentially dangerous buffeting and sharply decreased fuel efficiency. Also, an enclosed TMA cartridge in its upright position substantially limits visibility for following drivers.

Figure 10:
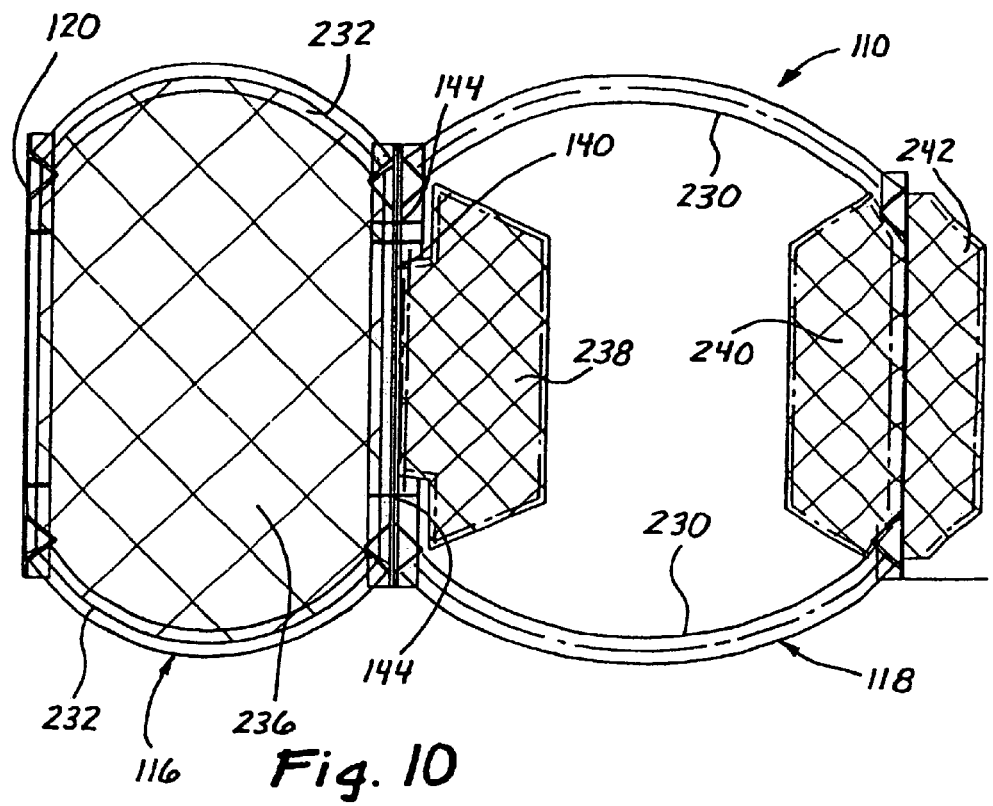
FIG. 10 is a top view of an alternative, presently preferred embodiment of a truck mounted attenuator constructed in accordance with the principles of the present invention.
Figure 11:
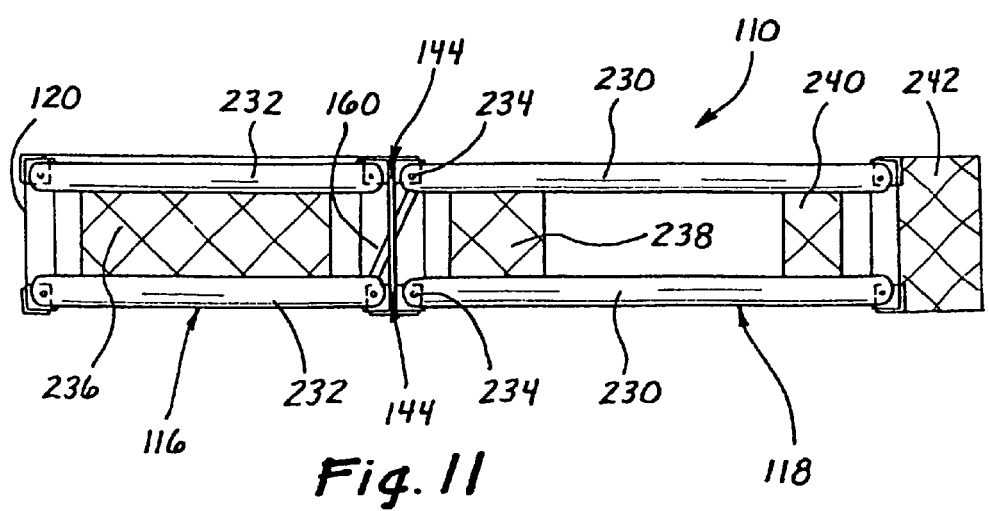
FIG. 11 is a side view of the truck mounted attenuator illustrated in FIG. 10.
Figure 15:
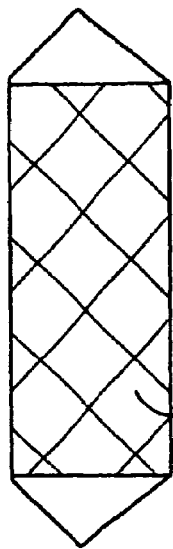
FIG. 15 is an isolation view from the top illustrating another one of the energy absorptive cartridges which is employed on the inventive TMA apparatus, wherein the illustrated energy absorptive cartridge is constructed in accordance with the principles of the present invention.
Figure 16:
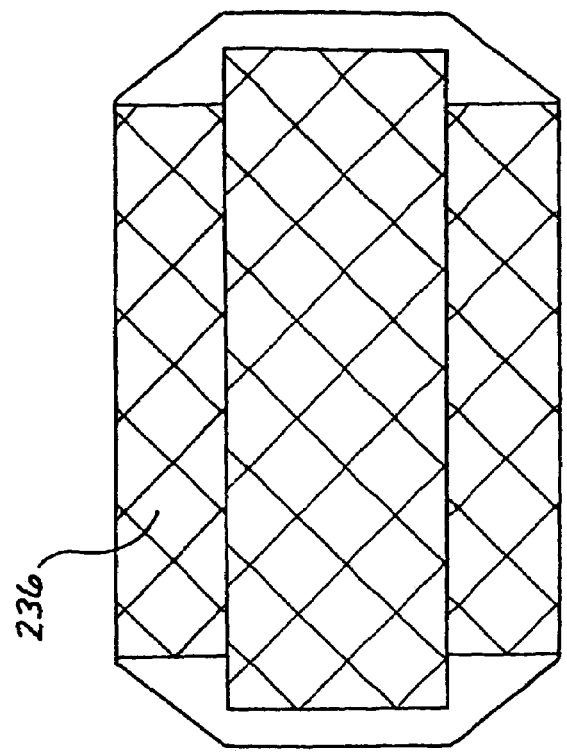
FIG. 16 is an isolation view from the top illustrating still another one of the energy absorptive cartridges which is employed on the inventive TMA apparatus, wherein the illustrated energy absorptive cartridge is constructed in accordance with the principles of the present invention.
Figure 13:
FIG. 13 is an isolation view from the top illustrating one of the energy absorptive cartridges which is employed on the inventive TMA apparatus, wherein the illustrated energy absorptive cartridge is constructed in accordance with the principles of the present invention.
Figure 14:
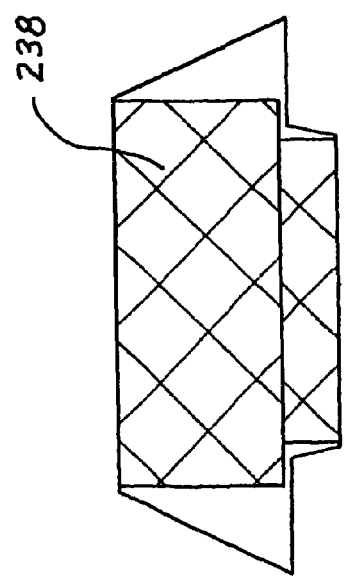
FIG. 14 is an isolation view from the top illustrating another one of the energy absorptive cartridges which is employed on the inventive TMA apparatus, wherein the illustrated energy absorptive cartridge is constructed in accordance with the principles of the present invention.

An alternative, presently preferred TMA embodiment is shown in FIGS. 10-19. In this embodiment, wherein like elements are designated by like reference numerals, preceded by 100, there is shown a TMA 110, which comprises a strut portion 116 and a cartridge portion 118. The TMA cartridge 118 is pivotally attached to the strut 116 by means of pivot joints 144 (FIGS. 10 and 11).

The TMA 110 is designed to function in much the same way as the TMA 10 shown in FIGS. 1-8. For example, it is deployable in both the use orientation 22 shown in FIG. 1, and in the transport orientation 24 shown in FIG. 2. Additionally, with reference to FIG. 17, the TMA 110 may be deployable into a second transport orientation 124a which might be referred to as a "second 90 degree" orientation, meaning that the cartridge 118 is tilted a further 90 degrees from its orientation in the transport orientation 24, back to a substantially horizontal orientation over the rear end 112 of the truck, and the strut 116 is tilted 90 degrees to a vertical orientation behind the truck. Of course, in most instances, this is the most efficient and compact arrangement for ready transport of the TMA-equipped truck 114 from place to place.

Figure 17:
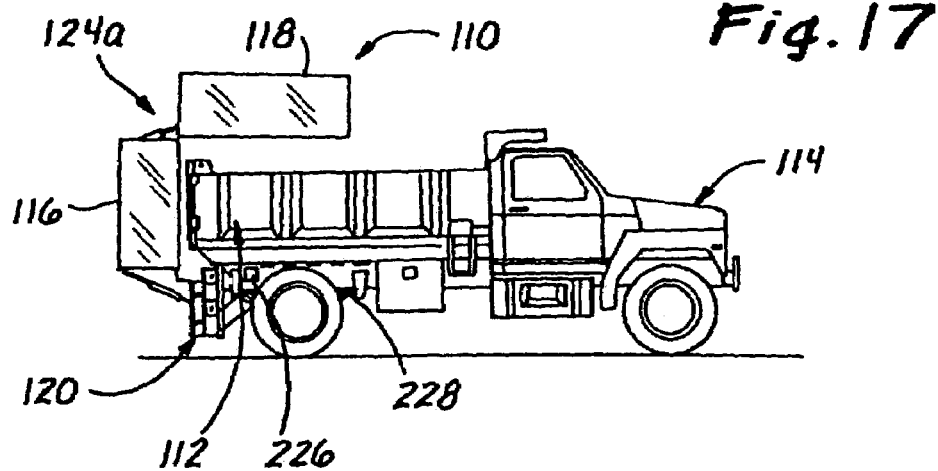
FIG. 17 is side view of a truck, similar to those of FIGS. 1 and 2, wherein the truck mounted attenuator disposed thereon is deployed in a second more compact transport orientation.
Figure 18:
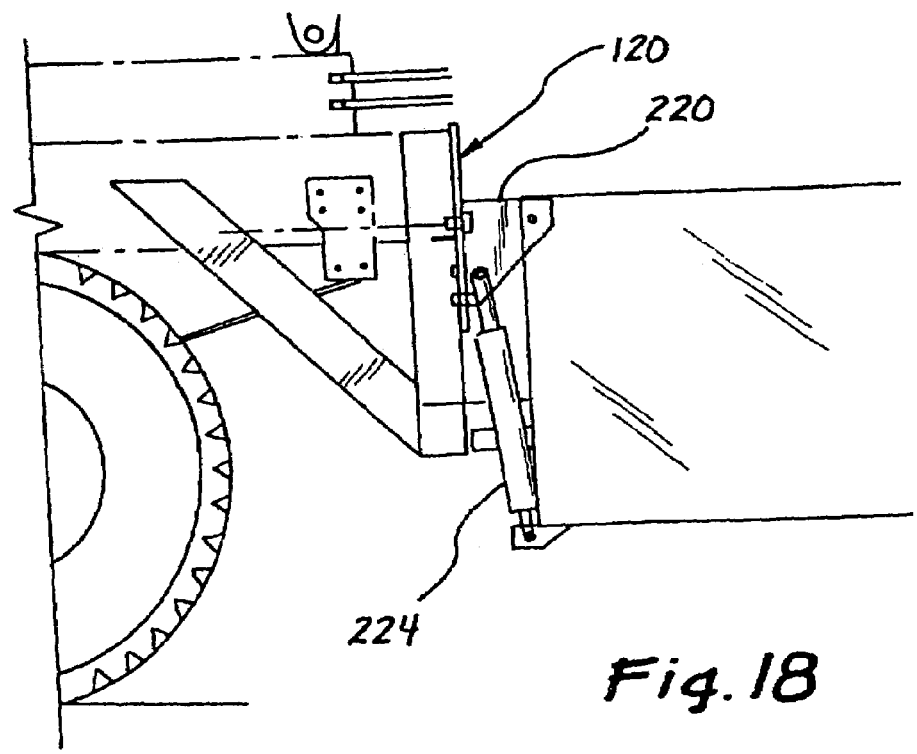
FIG. 18 is an enlarged view of a portion of FIG. 17, showing the mechanical engagement of the rigid backup mounted on the truck and the truck mounted attenuator.
Figure 19:
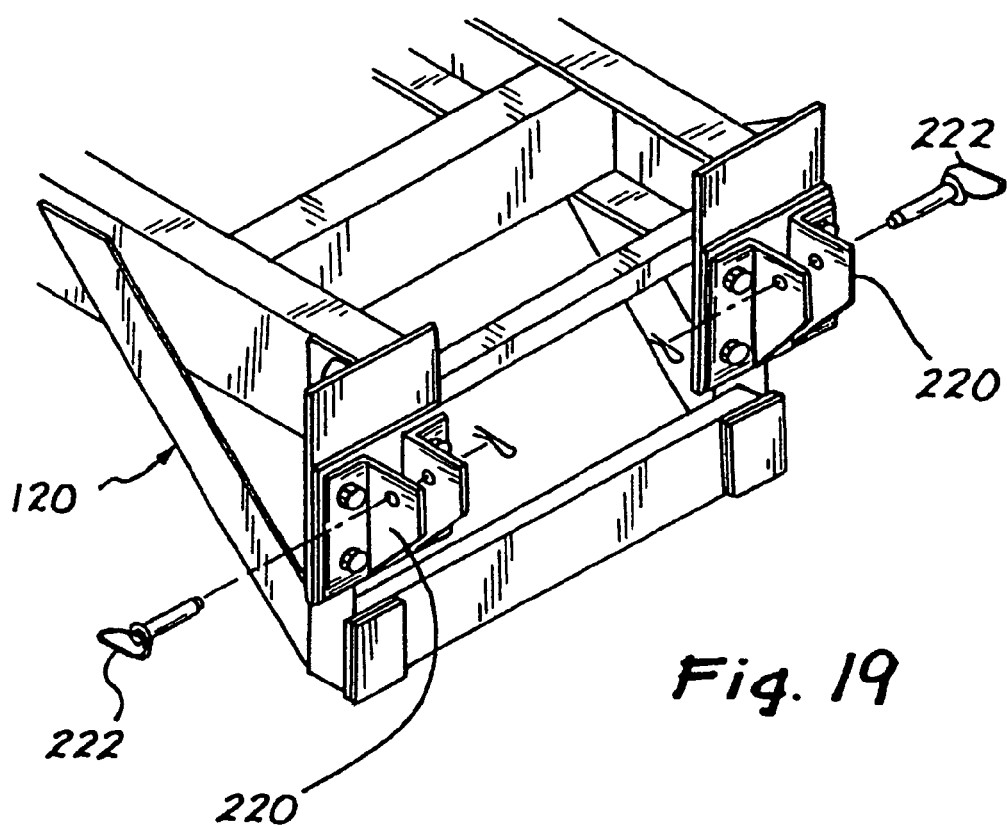
FIG. 19 is a perspective view of the rigid backup shown in FIG. 18.

With reference now particularly to FIGS. 17-19, certain constructional details of the "second 90 degree" tilt actuation system, and other details concerning the attachment of the TMA 110 to the backup 120 are shown. The backup 120, which is preferably made of a rigid material such as steel, but can be made of other similar materials as well, includes a pair of brackets 220 to which a front end of the strut portion 116 may be secured, by means of removable pins 222, or other suitable, preferably quick-release, pivotable, mechanical attachment means. In addition to the hydraulic pistons employed in the embodiment of FIGS. 1-8, a pair of hydraulic pistons 224 (only one is shown) are employed in the TMA 110 for assisting in the securement of the strut 116 to the backup 120, but primarily for the purpose of actuating the strut 116 from a generally horizontal, rearwardly extending configuration, suitable for both the use orientation 22 of FIG. 1 the transport orientation 24 of FIG. 2, to a generally vertical, upwardly extending configuration as shown in FIG. 17. Specifically, there is provided a suitable actuation mechanism, such as a hydraulic pump 226 which is operationally connected to the hydraulic pistons 224, and to suitable controls in the cab of the truck via a cable 228 or the like (alternatively, instead of cab controls, the controls could be actuated from the rear of the truck). Then, when it is desired to actuate the strut between the aforementioned horizontal and vertical orientations, the operator actuates the cab controls, causing the hydraulic pistons 224 to extend or retract telescopically relative to their respective cylinders, in known fashion, to pivot the strut 116 about the pivotable joint between the strut 116 and the backup 120. Similar actuation procedures are followed, as discussed supra, to pivot the cartridge between its horizontal and vertical orientations, as shown in FIGS. 1 and 2. When it is desired to re-orient the TMA 110 from the use orientation 22 shown in FIGS. 1, to the orientation shown in FIG. 17, the cartridge 118 is actuated to its upstanding position, as shown in FIG. 2, and then the strut is actuated to its upstanding position, with the cartridge maintaining its 90 degree relative angle to the strut, and thereby rotating over to its upper horizontal position, as shown in FIG. 17. When in either transport mode, mechanical lockout structure may be employed to limit stress on the hydraulic units, thereby extending their useful life by limiting wear.

An advantage of the "second 90 tilt option" is that it permits minimum truck overhang and extension, as noted supra, as well as minimum transport height, which improves truck driveability and reduces the need to plan alternative routes around low overhang bridges and the like.

Now again with reference to FIGS. 10-16, a difference between this embodiment and the embodiment of FIG. 1 is that, rather than employing hoops, only outer bowed members are utilized in both the strut and the cartridge. Thus, the cartridge 118 includes a pair of vertically spaced outwardly curved members 230, and the strut similarly includes a pair of vertically spaced outwardly curved members 232. In the preferred embodiment these members 230, 232 comprise aluminum tubing (a preferred size is 4½ inch diameter), though other materials, sizes, and configurations having suitable similar properties may be used. Vertically spaced members 140 are disposed between the strut 116 and cartridge 118, for the purpose of providing a suitable means for pivotally attaching the strut and cartridge to one another, via pivot joints or hinges 144, for example. Preferably, quick-release pins 234 are utilized to join the strut and cartridge to one another. An advantage of such an arrangement is that, in the event the cartridge is impacted by an errant vehicle and becomes damaged, it may be removed and replaced immediately on site, avoiding the necessity of having to transport a damaged, and therefore considerably wider cartridge to a repair depot, with its attendant safety compromises. The modular construction of the inventive TMA, wherein the strut and cartridge are removably attached, and the strut is removably attached to the backup, is a significant advantage over prior art construction.

The inventive TMA 110 utilizes an open construction similar to that of the embodiment of FIG. 1, but also employs a plurality of energy absorbent cartridges 236, 238, 240, and 242, as shown in FIGS. 10-16. These cartridges are preferably constructed of an aluminum honeycomb material disposed in environmentally sealed aluminum containers. The aluminum honeycomb material in cartridges 236, 238, and 240 preferably comprises 1 inch cells, while the aluminum honeycomb material in the cartridge 242 preferably comprises ½ inch cells. Of course, subject to routine testing and particular desired applications, alternative materials and cell sizes could be selected, if desired. The inventor has found that the honeycomb material should include spaced holes stamped in the middle of the assembly, for venting air trapped in the honeycomb. Failure to provide such breathing holes could create instability when an onset force is applied to the TMA structure, creating an inconsistent response of the structure to impact forces.

The outwardly curved tubular construction of the inventive TMA structure is an extremely important feature of the invention, representing a significant improvement over the prior art. The alternative use of straight tubes would result in the need for a high onset force in order to initiate the crush response noted in FIG. 8, for example. This would create an unpredictable, and therefore useless structure. Alternatively, the outwardly curved tubes require a much lower onset force (and resultant g force levels), and they always bias or buckle outwardly (as shown in FIG. 8) in a predictable manner. In essence, the tube frame creates a skeleton for the structure. During impact, the skeleton controls the side and vertical response. Additionally, the skeleton renders the inventive TMA much more rugged in transport.

In a preferred embodiment, the TMA 110 is approximately 13 feet long when fully deployed in its use orientation 22. Together, the aluminum cartridge 118 and strut 116 weight about 1100 pounds, and the unique curved aluminum tube frame provides unparalleled protection against so-called "coffin corner" impacts (where an errant vehicle impacts the TMA from the side, at an angle, rather than directly from the rear. Preferably, the TMA is coated with a durable polyester powder coat for maximum longevity, though other suitable coatings may be employed as well. In this embodiment, the design is such that upon impact by a typical small vehicle, the vehicle will be fully stopped prior to contact with the strut portion of the TMA. However, the unit 236, deployed in the strut portion 116 is available to provide protection in the event of a large vehicle (truck) impact, for example. Though cartridges 238, 240, and 242 are deployed in the cartridge portion 118 of the TMA, the construction is still sufficiently open (i.e. greater than 50% open) to derive the benefit of an open construction discussed supra. In other words, the TMA 110 still provides a surprising benefit in reducing wind resistance and resultant buffeting at high speed which plagues prior art designs.

If desired, in order to increase the stability and strength of the tubular structure, cables can be secured between opposing corners of each of the cartridge 18, 118 and strut 16, 116, though the inventor has found that, in practice, this is unnecessary.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A crash impact attenuator for deployment on a vehicle, comprising:
    a strut portion disposed behind said vehicle and comprising a plurality of outwardly curved structural members defining an open space therebetween, each of said outwardly curved structural members being tubular; and
    a cartridge portion disposed behind and joined to said strut portion, said cartridge portion being pivotally attached to said strut portion, so that said cartridge portion is movable between a deployed position and a stored position.

2. The crash impact attenuator as recited in claim 1, wherein said cartridge portion comprises a plurality of outwardly curved structural members defining an open space therebetween.

3. A crash impact attenuator for deployment on a vehicle, comprising:
    a strut portion disposed behind said vehicle;
    a cartridge portion disposed behind said strut portion, said cartridge portion having a first side and a second side, wherein each of said sides comprises a plurality of outwardly curved structural members, each of said structural members being tubular and rigid along its entire length prior to impact by a vehicle; and
    separator members disposed at a rearward end of the strut portion, said plurality of outwardly curved structural members each being connected to one of said separator members.

4. A crash impact attenuator attachable to a vehicle, comprising:
    a strut portion that is disposed behind said vehicle when the crash impact attenuator is attached to said vehicle; and
    a cartridge portion pivotally joined to said strut portion;
    said cartridge portion being pivotable between a first deployed position, wherein said cartridge portion is disposed generally horizontally behind said strut portion, and a second undeployed position, wherein said cartridge is disposed higher than said strut portion, in a generally horizontal orientation.

5. The crash impact attenuator as recited in claim 4, wherein the cartridge portion is further pivotable to a third undeployed position, wherein said cartridge portion is disposed in a more vertical orientation, relative to a generally horizontal orientation of the strut portion.

6. A crash impact attenuator attachable to a vehicle, comprising:
    at least four outwardly curved structural members, wherein first and second ones of said structural members are disposed in vertically spaced relation along one side of said crash attenuator and third and fourth ones of said structural members are disposed in vertical spaced relation along an opposing side of said crash attenuator;
    wherein said at least four structural members form a strut portion which is attached to the vehicle, said structural members being rigid along substantially their entire length prior to vehicular impact and extending from a front end to a rear end of said strut portion; and
    a cartridge portion joined to a rear end of said strut portion.

7. The crash attenuator as recited in claim 6, wherein said cartridge portion is comprised of at least four outwardly curved structural members, wherein fifth and sixth ones of said structural members are disposed in vertically spaced relation along one side of the cartridge portion and seventh and eighth ones of said structural members are disposed in vertically spaced relation along an opposing side of said cartridge portion.

8. A crash impact attenuator for deployment on a vehicle, comprising:
    a first attenuator portion comprising opposing side members, which is attached to said vehicle when the crash impact attenuator is attached to the vehicle; and
    a second attenuator portion comprising opposing side members, said second attenuator portion being pivotally joined to said first attenuator portion;
    said second attenuator portion being pivotable between a first deployed position, wherein said second attenuator portion is disposed generally horizontally behind said first attenuator portion, and a second undeployed position, wherein said second attenuator portion is disposed higher than said first attenuator portion, in a generally horizontal orientation.

9. The crash impact attenuator as recited in claim 8, said second attenuator portion being further pivotable to a third undeployed position, wherein said second attenuator portion is disposed in a more vertical orientation, relative to a generally horizontal orientation of the first attenuator portion.

10. The crash impact attenuator as recited in claim 8, wherein when said second attenuator portion is in said second, undeployed position, it is elevated relative to said vehicle.

11. The crash impact attenuator as recited in claim 10, wherein when said second attenuator portion is in said second, undeployed position, it is disposed over said vehicle.

* * * * *